UNITED STATES PATENT OFFICE.

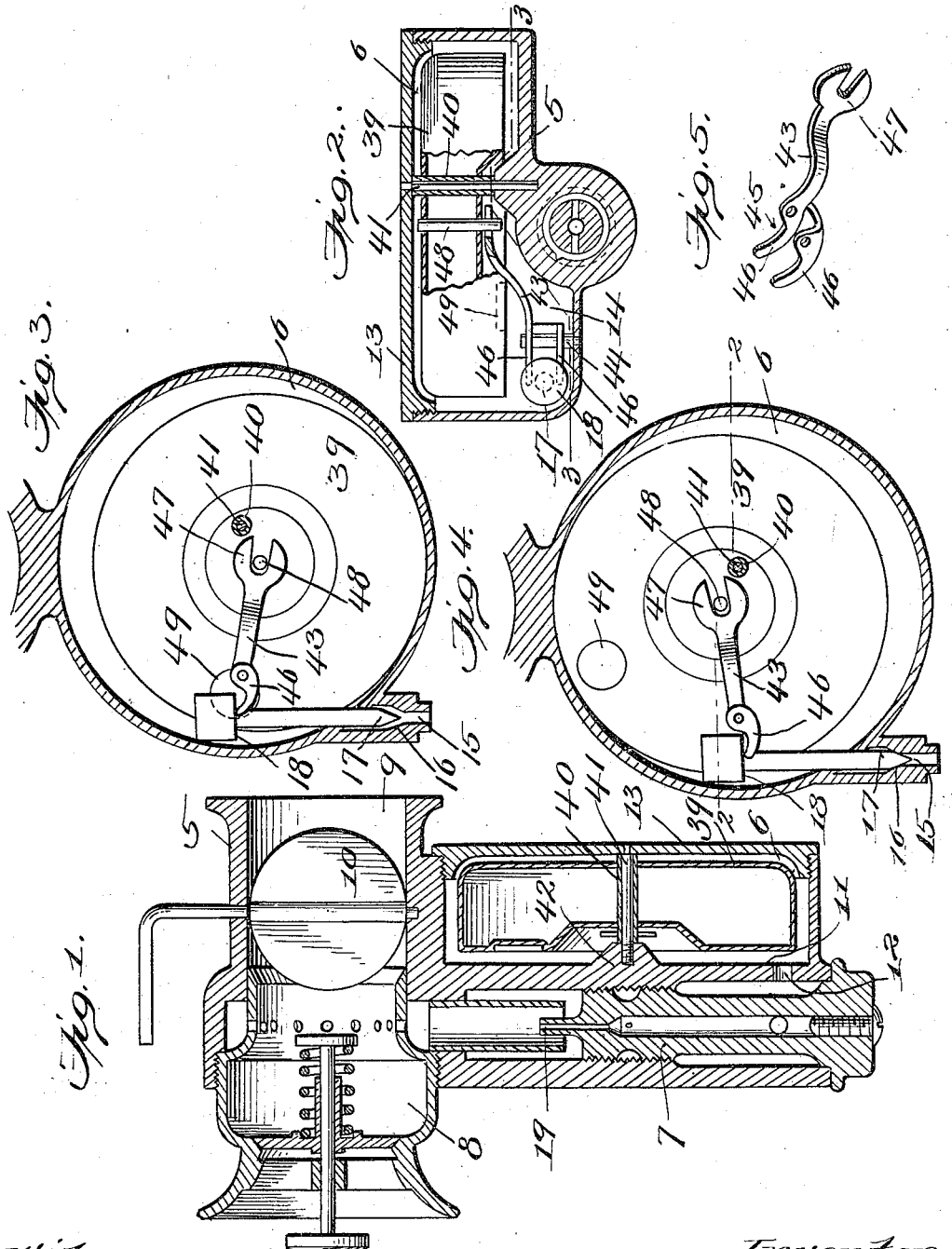

FRANKLIN W. HAGAR, OF NASHVILLE, TENNESSEE; ALBERT S. DAVIS EXECUTOR OF FRANK W. HAGAR, DECEASED.

FLOAT FEED-CHAMBER AND FLOAT FOR CARBURETERS.

1,240,200. Specification of Letters Patent. Patented Sept. 18, 1917.

Original application filed July 14, 1915, Serial No. 39,866. Divided and this application filed August 22, 1916. Serial No. 116,338.

*To all whom it may concern:*

Be it known that I, FRANKLIN W. HAGAR, a citizen of the United States, residing at Nashville, in the county of Davidson and State of Tennessee, have invented new and useful Improvements in Float Feed-Chambers and Floats for Carbureters, of which the following is a specification.

This invention relates to float chambers and floats for carbureters and operable with either gasolene or other analogous hydrocarbon, and the primary object of the invention is to provide a float feed chamber and float of novel form and automatically operating to perform its function, the float being so mounted in the float chamber as to be free for movement or without any resistance to its up and down motions to control the admission of oil or hydrocarbon to the chamber and the level of the hydrocarbon in the latter, the improved float operating to practically control the oil level in the float chamber irrespective of the uneven road surface over which the carbureter embodying the improved float feed chamber and float may be conveyed. In other words, the float will positively operate and insure the requisite supply of hydrocarbon in the float chamber or float feed chamber irrespective of the position of the vehicle containing the motor to which the carbureter embodying the improved float feed chamber and float is attached, and by this means all road conditions will be perfectly met.

The improved float and float chamber for regulating the supply and feed of the oil or hydrocarbon as will be hereinafter explained embody subject-matter originally disclosed in my pending application Serial No. 39,866, filed July 14, 1915. In this divisional application so much of the carbureter as is necessary to illustrate the functions of the improved float and float feed chamber has been embodied as a preferred application, but it will be understood that the improved float and float feed chamber may be used with any other form of carbureter to which it may be applicable or with any other device requiring an automatic liquid feed control and maintenance of a predetermined supply of liquid.

In the drawing:

Figure 1 is a section taken through a preferred form of carbureter and showing the improved float feed chamber and float in connection therewith.

Fig. 2 is a horizontal section taken in the plane of the line 2—2, Fig. 4.

Figs. 3 and 4 are sectional elevations, partially in diagram, taken in the plane of the line 3—3, Fig. 2, and showing the float feed regulation under different conditions.

Fig. 5 is a detail perspective view of a rocker arm controlled by the float and engaging a portion of the needle valve which regulates the supply of liquid or hydrocarbon to the float feed chamber.

The carbureter shown for the purpose of demonstrating the application of the improved float or float feed chamber and float comprises a casing 5, a float feed chamber 6, an elongated nozzle 7, and a top cylindrical air charging duct 8 having an outlet 9 in which a throttle valve 10 is mounted. Between the float feed chamber 6 and the chamber of the nozzle 7 is a wall 11 with an opening 12 therein to set up communication between the said float feed chamber and nozzle chamber. The float feed chamber 6 is provided with a removable closing cap 13, and as shown by Fig. 2 said chamber has communication with an inlet member or chamber 14 offset from the float feed chamber and provided with a lower inlet port 15 having a valve seat 16, as shown in sectional diagram by Figs. 3 and 4, and coöperating with the valve seat is a needle valve 17 having an elongated weight collar 18 formed as a part thereof and provided with an annular shoulder with relation to the needle valve for a purpose which will be presently explained. The inlet port 15 is adapted to be connected to a gasolene or hydrocarbon supply source and the needle valve with its weighted collar 18 is mounted to vertically reciprocate or move in the offset inlet member or chamber 14 to permit inlet of the gasolene or hydrocarbon into or cut off the gasolene or hydrocarbon from the said inlet member or chamber. The carbureter also includes a spray nozzle 19 for receiving and spraying the gasolene or hydrocarbon and preparing the same for mixture with air as fully explained in my copending application above noted and therefore need not be further described herein. The needle valve 17 coöperating with an inlet port 15 or having an automatic movement to control the feed of the gasolene or hydrocarbon relatively to the chamber 6 by way of the chamber or member 14 will be readily understood, as such construction and operation of parts are well known in the art.

The improvement consists mainly of a float 39 eccentrically mounted in the float feed chamber 6, the particular mounting for this float consisting of a bushing 40 disposed therein, as clearly shown by Figs. 1 and 2, and through the said bushing a rod or pin 41 is inserted and has bearing at its opposite ends in an enlargement 42 of the wall 11 and in the closing cap 13. This pin 41 serves as the fulcrum of the float and is held against rotation, the bushing or sleeve 40 being held fixed in the float and free to rotate on this fulcrum pin. The bushing 40 is mounted in the float to one side of the center of the latter and with the pin 41 an eccentric mounting for the float is provided. By means of the eccentric mounting of the float it will be seen that it will have a tilting or dipping action when the charge in the float feed chamber 6 lowers below a certain point, and the control of the supply of gasolene, kerosene or other hydrocarbon to the float chamber is accomplished through the needle valve 17 and the float 39 by means of an intermediate rocker arm 43, shown in detail by Fig. 5. The rocker arm 43 is fulcrumed on a pin 44 which passes through the outer extremity thereof, said extremity being in the form of a head 45 embodying two curved arms 46 which loosely engage the lower end of the weight collar 18 of the needle valve 17, as shown by Figs. 3 and 4, the arms 46 embracing the stem of the needle valve adjacent to the lower end of the weight collar. The inner end of the rocker arm 43 is enlarged and bifurcated, as at 47, and loosely engages a pin 48 fixed to and inwardly projecting from the float 39 and carried exclusively by the float, as shown by Fig. 2. The pin 44 on which the arm 43 is fulcrumed is fixed to one wall of and projects inwardly from said wall into the member or inlet chamber 14, as shown by Fig. 2.

When the float tilts by reason of the lowering of the hydrocarbon in the chamber 6, the inner extremity or end 47 of the rocker arm 43 lowers with the float and the outer end of said rocker arm elevates and raises the needle valve 17 through the medium of the weight collar 18 to clear the inlet port 15 and permit the liquid hydrocarbon to flow into the chamber 14 and from the latter into the chamber 6 until the normal or predetermined level desired is obtained in the latter chamber. As the liquid hydrocarbon flows into the chamber 6 the float 39 gradually assumes a normal position, and when said float reaches a normal position the inner extremity of the rocker arm is elevated and the outer extremity or head 45 of said arm is lowered and the valve 17 simultaneously lowers to close the bore or inlet port 15 and thereby shut off further ingress of the hydrocarbon into the float feed chamber. To assist the float 39 in its sensitive operation it is provided with a weight, as at 49, said weight insuring a quick drop or lowering of the portion of the float 39 beyond the fulcrum pin 41. The improved float is very compact in its organization and occupies a comparatively small space, with material advantages in the installation thereof in connection with carbureters or other devices without depreciation of its service in operation as an automatic means for regulating the inflow of the liquid hydrocarbon into the float feed chamber and for maintaining the said hydrocarbon at a uniform level under all conditions.

The operation of the float is clearly shown by Figs. 3 and 4, and as illustrated by Fig. 3 the float 39 has lowered in its chamber 6 by reason of the fall of the liquid hydrocarbon below a certain predetermined point, and it will be seen that the rocker arm 43 has been lowered at its inner extremity and that its outer or head extremity is elevated, and as a consequence the valve 17 is elevated to open the port 15 and permit the liquid hydrocarbon to flow into the chamber 14 and float chamber 6. In Fig. 4 the liquid hydrocarbon in the chamber 6 has been restored to its normal predetermined level and the float 39 has risen, and as a consequence the rocker arm 43 is in a position reverse to that shown by Fig. 3 and the valve 17 is closed. The effect of the weight 49 on the float is very essential in the operation of the latter. When the liquid hydrocarbon, of whatever character it may be, begins to lower from a predetermined normal level elevation thereof in the float chamber 6 the weighted float 39 partially rotates and starts downwardly or gravitates in the said chamber 6 and as the greater portion of the float carrying the weight lowers, it naturally becomes heavier, as it were, or more effective in its leverage on the pin 48 and the gravitating needle valve 17 is more quickly opened by reason of the correspondingly quick downward movement of the float, and the float chamber 6 will therefore rapidly fill to a sufficient extent to start the float on its upward movement. As the float 39 rises the resistance of the weight 49 becomes less by being overcome by the buoyancy of the float, and as a consequence the float in its upward movement is quickened or is rendered faster than the elevation of the oil surface and the valve 17 is caused to close more rapidly than it would otherwise, and the result is that the predetermined oil level within the chamber 6 is soon reëstablished and is maintained throughout all conditions without any perceptible change. Therefore it will be understood that the valve 17 is opened to permit ingress of the charge of hydrocarbon to the chamber 6 before the normal level of the liquid in the said chamber has been materially modified, and, conversely, the float begins to rise and reaches an elevation sufficient to cause the valve 17 to shut off the ingress of the liquid hydrocarbon just at the time that the normal level of liquid hydrocarbon is reached in the float chamber. There is no resistance to the up and down movements of the float by the fulcrum pin 41 of the latter, and as a consequence the float will be very sensitive in maintaining a predetermined level of the hydrocarbon in the chamber 6 and will not be affected by movements over uneven road surfaces, and hence when the float is once set in its operative position it will be practical and effective to serve the particular functions for which it has been devised. The point of contact of the pin 48 relatively to the rocker arm 43 is about the center of gravity in every direction with respect to the float in view of the position of the weight 49. If the pin 41 was omitted and the float allowed to move freely as in ordinary float constructions, two oil levels would be established which would be objectionable, as will be readily understood. By the particular mounting of the float as specified one predetermined oil level is always maintained and as a consequence a regular supply of the hydrocarbon from the chamber 6 will ensue through the nozzle of the carbureter for proper mixture with air, no matter what the road conditions may be.

What is claimed is:

1. A float feed chamber having communication with a supply inlet, a valve operably mounted to close the said inlet, and a float eccentrically fulcrumed through the body portion thereof in the said float feed chamber and provided with a projection coöperating with means engaging the said valve to automatically open the latter and also permitting the said valve to close.

2. A float feed chamber having communication with a supply inlet provided with a valve, and a vertically disposed float mounted in the said chamber and eccentrically engaged by a fulcrum device which is loosely fitted relatively to the body and within the periphery of the float, the float also being provided with a projection coöperating with means engaging the valve to control the operation of the said valve.

3. A float feed chamber in communication with a supply inlet provided with a valve, a float mounted in the said chamber and having a fulcrum device eccentrically engaging the body thereof, the float also having a projection, the fulcrum device and projection being disposed within the periphery of the body of the float, and means between the projection of the float and the valve for controlling the operation of the latter.

4. A float feed chamber in communication with a supply inlet provided with a valve, and a float mounted in the said chamber and having a fulcrum eccentrically and loosely engaging the body thereof within the periphery of the said body to permit the float to have a tilting movement, the float also being provided with means for controlling the operation of the valve.

5. A float feed chamber having communication with a supply inlet provided with a valve, and a float mounted in the said chamber and having a fulcrum means eccentrically engaging the body thereof and also provided with a weight attachment on the portion thereof which has the greater projection beyond the fulcrum means, the float also provided with means for controlling the operation of the valve.

6. A float feed chamber in communication with a supply inlet provided with a valve, a vertically disposed float eccentrically fulcrumed in the said chamber, the fulcrum for the float engaging the same within the periphery of the body thereof, and a rocker arm interposed between the float and a portion of the valve of the supply inlet.

7. A float feed chamber in communication with a supply inlet provided with a valve, a float mounted in the chamber and having an eccentric fulcrum pin loosely engaging the body thereof and a center pin fixed thereto, and an operating lever interposed between and engaging said center pin and a portion of the valve to automatically operate and control the movements of the said valve to regulate the ingress of liquid to and cut off the supply of liquid from the said chamber.

In testimony whereof I have hereunto set my hand in presence of two subscribing witnesses.

FRANKLIN W. HAGAR.

Witnesses:
 CHAS. W. FRIERSON,
 W. M. MOMIRSEY.